United States Patent [19]
Weinstein

[11] Patent Number: 5,939,799
[45] Date of Patent: Aug. 17, 1999

[54] UNINTERRUPTIBLE POWER SUPPLY WITH AN AUTOMATIC TRANSFER SWITCH

[75] Inventor: Robert E. Weinstein, Louisville, Colo.

[73] Assignee: Storage Technology Corporation, Louisville, Colo.

[21] Appl. No.: 08/893,350

[22] Filed: Jul. 16, 1997

[51] Int. Cl.[6] .................................................. H02J 9/06
[52] U.S. Cl. .......................... 307/64; 307/45; 307/46; 307/66; 395/182.12; 395/750.01
[58] Field of Search ................... 307/64, 66, 80, 307/45, 46; 361/90; 364/528.28; 395/750.01, 182.12

[56] References Cited

U.S. PATENT DOCUMENTS

| | | | |
|---|---|---|---|
| 4,277,692 | 7/1981 | Small | 307/66 |
| 4,340,823 | 7/1982 | Miyazawa | 307/66 |
| 4,638,175 | 1/1987 | Bradford et al. | 361/90 |
| 5,049,805 | 9/1991 | Celenza et al. | 307/66 |
| 5,111,058 | 5/1992 | Martin | 307/66 |
| 5,767,591 | 6/1998 | Pinkerton | 307/64 |

*Primary Examiner*—Albert W. Paladini
*Attorney, Agent, or Firm*—Duft, Graziano & Forest

[57] ABSTRACT

Power is supplied to a load from either a first power source or a second power source. A transfer switch determines which of the power sources provides the power to the load. A switch control detects a loss in the power provided by a first power source and signals the transfer switch to switch to a second power source. A small energy storage device provides power to the load, during the switch from the first power source to the second power source.

10 Claims, 1 Drawing Sheet

UNINTERRUPTIBLE POWER SUPPLY WITH AN AUTOMATIC TRANSFER SWITCH

FIELD OF THE INVENTION

The present invention relates to an uninterruptible power supply for a load. More particularly, the present invention relates to switching a power supply input from a first power source to a second power source when power from the first power source is interrupted. Still more particularly, the invention relates to supplying power to a load during the switch from the first power source to the second power source.

PROBLEM

Interruptions frequently occur in power supplied by a conventional power source to a load. If an interruption in power lasts longer than a hold-over time of the load, the load ceases operation. Most loads perform operations that can be repeated or restarted after power is restored and the interruption is not a problem. These loads can be powered by a conventional power source.

Some critical loads perform operations which must not be interrupted or an undesirable failure of the operation will occur. A critical load, performing such an operation, cannot have power interrupted for longer than the hold-over time of the load. One example of a critical load is a memory system. Memory systems provide continuous data storage operations. Any interruption in the power supplied to the memory can cause a data storage operation fail and cause a loss of data.

It is a problem to provide an uninterruptible supply of power to a load performing a critical operation. One solution is to supply power to the load with a conventional power source and a battery that provides power for a hold-over time until power is restored from the power source. The cost and the size of the battery increase as hold-over time increases. These increases in cost and size prohibit batteries from being used for any great length of time to supply power to most loads.

SOLUTION

The above and other problems are solved by the present invention. In a preferred embodiment exemplary of the present invention, a first and a second independent power source are connected to an input of a transfer switch, which selectively receives an AC current from one of the two independent power sources. The transfer switch normally receives power from the first independent power source. A low voltage detector connected to the output of the transfer switch detects the loss of power from the transfer switch output caused by an interruption of power supplied by the first power source. When the low voltage detector detects a drop in power, the transfer switch switches from receiving an AC current from the first power source to receiving an AC current from a second power source. However, the detection of a drop in voltage and the switching from the first power source takes more time than the hold-over time of some loads. In order to prevent an interruption in power supplied to the load during the switch from the first to the second source, the present invention uses a capacitor or other energy storage device that supplies power to a load during the switch from the first to the second source.

The preferred embodiment operates in the following manner. The first independent power source supplies the AC current to the transfer switch. The transfer switch outputs the received AC current to an AC to DC converter which has an output that extends a DC current. A switch controller with a low voltage detector is connected to the output of the AC to DC converter. The low voltage detector detects a drop in the voltage of the DC current from the converter indicating that an interruption in the power supplied by the first independent power source has occurred. When a drop in voltage is detected, the switch control generates an activation signal which is transmitted from the switch control to the transfer switch. The transfer switch switches from the first AC power source to the second power source when an activation signal is received from the switch control.

The transfer time from the detection of a drop in voltage to the switch from the first to the second power source is up to 100 to 200 msec. Or more, due to the use of electromechanical switches required for safety reasons. Most loads have a hold-over time which is on the order of 20 to 50 msec. and must be powered during the time between the transfer time and the hold-over time. To supply power to the load during the switching of power sources, an energy storage device is connected to the output of the AC to DC converter. The energy storage device, such as a capacitor or a battery, supplies power to the load via the connection to the output of the AC to DC converter when the drop in voltage occurs.

Since the amount of power that must be supplied during switching to most loads is minimal, the storage device does not have to generate or store a great amount of energy and a relatively small storage device can be used. In the preferred embodiment, capacitors are used as the energy storage device, since they are a small and relatively maintenance-free storage device. After the switch has changed the power supply from the first to the second source, the energy storage device no longer supplies power to the output line.

If the load requires DC power, a DC current is extended to the load. If the load requires AC power, the AC to DC converter extends the DC current to a DC to AC converter which delivers the AC current to the load. The load receives an uninterrupted supply of power, regardless of the power source, via the output line.

DETAILED DESCRIPTION

Figure 1:
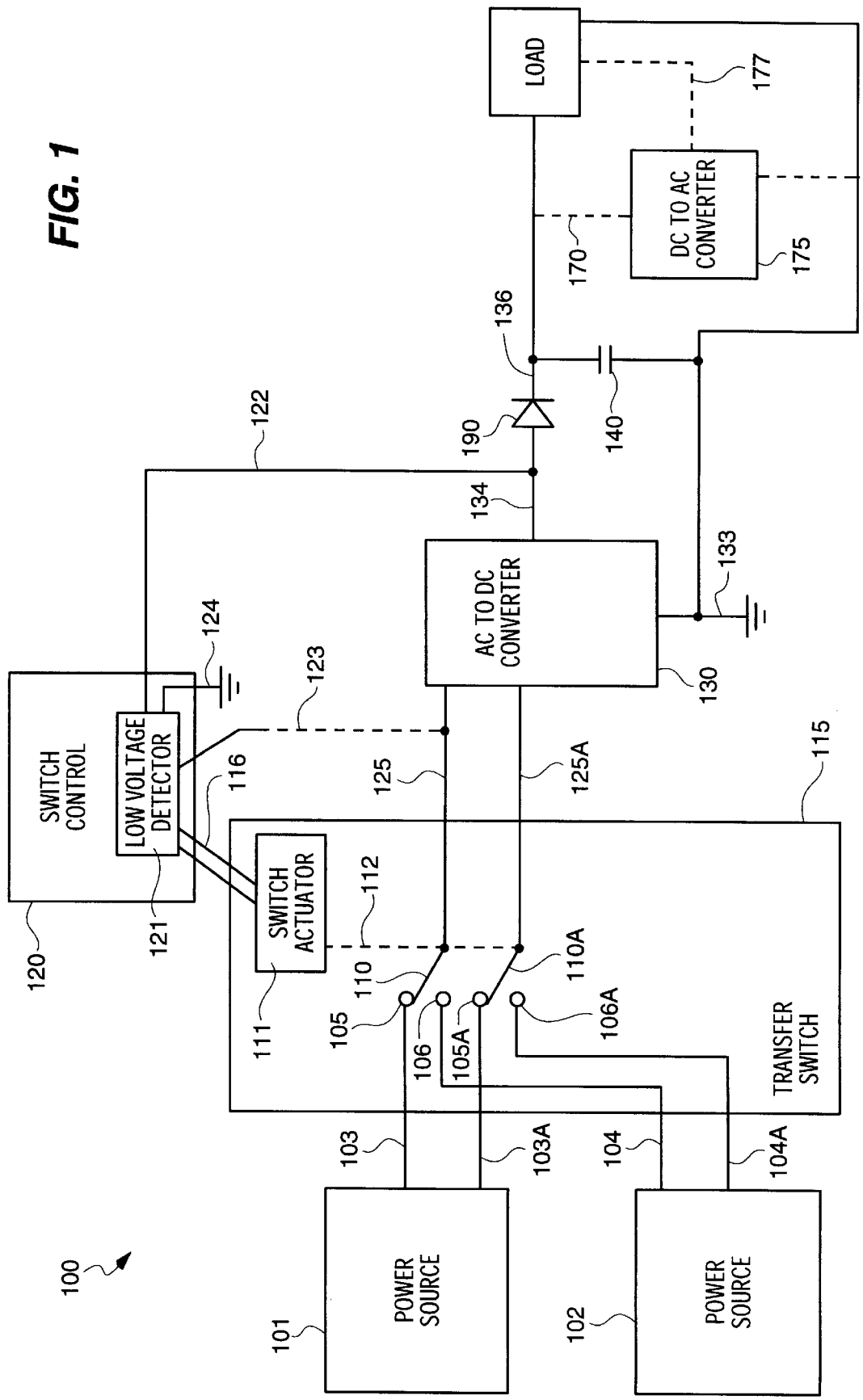
FIG. 1 discloses one possible preferred embodiment of the present invention.

FIG. 1 illustrates an exemplary preferred embodiment of Uninterruptible power can supply 100. Primary Power source 101 and secondary power source 102 supply AC to transfer switch 115. Transfer switch 115 receives the AC current from power source 101 over paths 103 and 103A. AC current from secondary power source 102 is received by transfer switch 115 over paths 104 and 104A. Under normal conditions, transfer switch 115 receives power from primary power source 101.

In transfer switch 115, contacts 105 and 105A receive AC from paths 103 and 103A. Contacts 106 and 106A receive AC from paths 104 and 104A. Movable contacts 110 and 110A are either connected to contacts 105/105A or contacts 106/106A to selectively receive the AC current from primary power source 101 or secondary power source 102. Switch actuator 111 controls the position of movable contacts 110 and 110A with electromagnetic arm 112 that is figuratively represented by a dotted line. When primary power source 101 fails, switch actuator 111 and electromagnetic arm 112 change the position of contacts 110/110A and movable contacts 110/110A receive the AC from secondary power source 102. The AC is output by transfer switch 115 via paths 125/125A.

AC to DC converter 130 receives the AC current from transfer switch 115 over paths 125/125A. Terminal 133 grounds AC to DC converter 130. DC current is extended over path 134 AC to DC by converter 130. Switch control 120 is connected to path 134 by path 122 to monitor the DC voltage on path 134. In an alternative embodiment, switch control 120 is connected to path 125 via path 123 to monitor the AC voltage on path 125.

Switch control 120 contains low voltage detector 121 receives DC via path 122 and detects a drop in the received voltage. Alternatively, low voltage detector 121 can receive AC current via path 123. Low voltage detector 121 is grounded by terminal 124. A detected drop in voltage is indicative of a failure of primary power source 101 and the position of movable contact 110 must be changed to receive the AC current from secondary power source 102. Switch control 120 now generates an activation signal and transmits the activation signal to transfer switch 115 via path 116. In transfer switch 115, the activation signal is received by switch actuator 111 over path 116. Switch actuator 111 changes the position of movable contacts 110/110A when the activation signal is received and movable contacts 110/110A receive the AC current from source 102.

Diode 190 also receives the DC current from AC to DC converter over path 134 and the DC current is extended through diode 190 to path 136. Diode 190 is connected between Capacitor 140 and AC to DC convertor 130 to prevent current from Capacitor 140 from flowing towards AC to DC Convertor 130. Diode 190 makes it possible to use a device storing minimal power to supply current to the load. The load 190 receives the DC power from path 136. Capacitor 140 is connected between path 136 and terminal 133.

A drop in voltage on path 134 indicates a failure of primary power source 101 to supply an AC current and that transfer switch 115 must now provide an AC current from secondary power source 102. The amount of time that is needed by switch control 120 to detect a drop in the voltage at terminal 132 and by transfer switch 115 to begin receiving an AC current from secondary power source 102 is up to 100 to 200 msec. Most loads have a hold-over time of about 20 to 50 msec. The hold-over time being the amount of time that the load can hold a charge, before more power is needed. Capacitor 140 supplies a DC current to the load over path 136 during the time needed to make the transfer between primary power source 101 and secondary power source 102. Therefore, the load always has a supply of power, and the difference between the holdover time and the time needed for the switching from source 101 to source 102 is not a concern.

Since the load must be powered for a minimal amount of time, only a minimal amount of energy must be stored to provide a current to the load during the transfer. In the preferred embodiment, capacitor 140 is used to store and provide the small amount of energy. Capacitor 140 is used because capacitors are a maintenance-free and reliable method to store and provide a short duration current to a circuit. A battery can also be used to provide the current during the switch from the first power source to the second power source. However, batteries require additional charge control circuitry, and have a definite lifetime and must be replaced at constant intervals, which requires maintenance of uninterruptible power supply 100. Furthermore, batteries are available only in particular voltages that may not be suitable for every application.

If the load requires a DC current, the DC current is extended over path 136 to the load. If the load requires an AC current, the DC current is extended from path 136 over path 170 to DC to AC converter 175 which is grounded by terminal 133. The load receives an AC current from DC to AC converter 175 over path 177. Terminal 133 grounds the load.

The present invention relates to uninterruptible power supply for a load. An energy storage device provides power to the load, while a transfer switch in the uninterruptible switch from a first power source supplying the power to a second power source supplying the power. Although specific embodiments are disclosed for example herein, it is expected that people skilled in the art can and will design alternative circuitry for providing two sources of uninterruptible power that is within the scope of the following claims either literally or through the doctrine of equivalents.

We claim:

1. An uninterruptible power supply for supplying power to a load comprising:

a transfer switch;

a first input and a second input of said transfer switch for selectively receiving AC power from a primary power source or a secondary power source of said AC power;

an AC output from said transfer switch;

an AC to DC converter having an input connected to said AC output of said transfer switch;

a DC output from said AC to DC converter;

a low voltage detector connected to said DC output of said AC to DC converter output for detecting a reduction in voltage of said AC power of said primary power source responsive to a failure of said primary power source;

means responsive to a detection of said reduction in said voltage for switching said transfer switch from receiving AC power from said primary power source to receiving AC power from said secondary power source;

a diode connected between said DC output of said AC to DC converter and an energy storage means for preventing current from flowing toward said AC to DC Converter;

an output of said diode for outputting said DC power received by said diode from said DC output of said AC to DC converter;

said energy storage means connected to said output of said diode for maintaining a relatively constant voltage during a time interval for said switching of said transfer switch from said first AC source to said second AC source; and an output connected to said energy storage means and said output of said diode for transmitting said DC power to said load.

2. The uninterruptible power supply of claim 1, wherein said energy storage means is a capacitor.

3. The uninterruptible power supply of claim 1, wherein said energy storage means is a battery.

4. The uninterruptible power supply of claim 1 further comprising:

an input of a DC to AC converter for receiving DC power from said output of said diode; and an output of said DC to AC converter for applying said DC power to said load.

5. The uninterruptible power supply of claim 1 wherein said transfer switch comprises:

a first contact for receiving said AC power from said first input;

a second contact for receiving said AC power from said second input;

a movable contact for selectively receiving said AC power from said first contact or second contact to said output of said transfer switch;

a switch actuator for moving said movable contact from a first position for receiving AC power from said first input to a second position for receiving AC power from said second input responsive to said detection of said drop in voltage.

6. The uninterruptible power supply of claim 5 further comprising:

a switch control connected to said DC output of said AC to DC converter;

a low voltage detector in said switch control for generating an activation signal responsive to a detection of said drop in voltage of said AC power supplied by said primary power source;

means for applying said activation signal said transfer switch; and said transfer switch being effective for switching from receiving said AC power from said first input to receiving AC power from said second input, responsive to said activation signal.

7. The uninterruptible power supply of claim 6, wherein said switch actuator comprising:

means for receiving said activation signal from said low voltage detector in said switch actuator; and an electromagnetic armature for moving said movable contact responsive to receiving said activation signal.

8. A method for supplying uninterrupted power to a load comprising the steps of:

receiving AC power from a first source;

converting said received AC power to DC power;

detecting a drop voltage of said DC power;

switching from receiving said AC power from said first source to receiving AC power from a second source responsive to a detection of a drop in voltage of said DC power;

maintaining said voltage of said DC power with an energy storage device during said switching from receiving power from said first AC source to said second AC source;

preventing said DC power from said energy storage device from flowing towards first source with a diode; and applying said DC power to said load.

9. The method of claim 8 wherein said step of switching comprises the step of:

moving a movable contact between a first connection with a first contact that provides AC power from said first AC source to a second connection with a second contact for providing Ac power from said second source.

10. The method of claim 8 further comprising the steps of:

converting said DC power to AC power; and applying said AC power to said load.

* * * * *